Sept. 4, 1928.  M. O. REHFUSS  1,683,486

CHAIN

Filed April 23, 1924

Inventor
Martin O. Rehfuss.
by his Attorneys.

Patented Sept. 4, 1928.

1,683,486

UNITED STATES PATENT OFFICE.

MARTIN O. REHFUSS, OF PHILADELPHIA, PENNSYLVANIA, ASSIGNOR TO UNITED STATES CHAIN AND FORGING COMPANY, OF PITTSBURGH, PENNSYLVANIA, A CORPORATION OF PENNSYLVANIA.

CHAIN.

Application filed April 23, 1924. Serial No. 708,435.

One object of my invention is to manufacture chains, in which the bodies of the links are on the same plane.

A further object of the invention is to manufacture chains, in which the links are made on an ordinary chain machine, welded and then twisted so that the bodies of the links are on the same plane.

Figure 1:
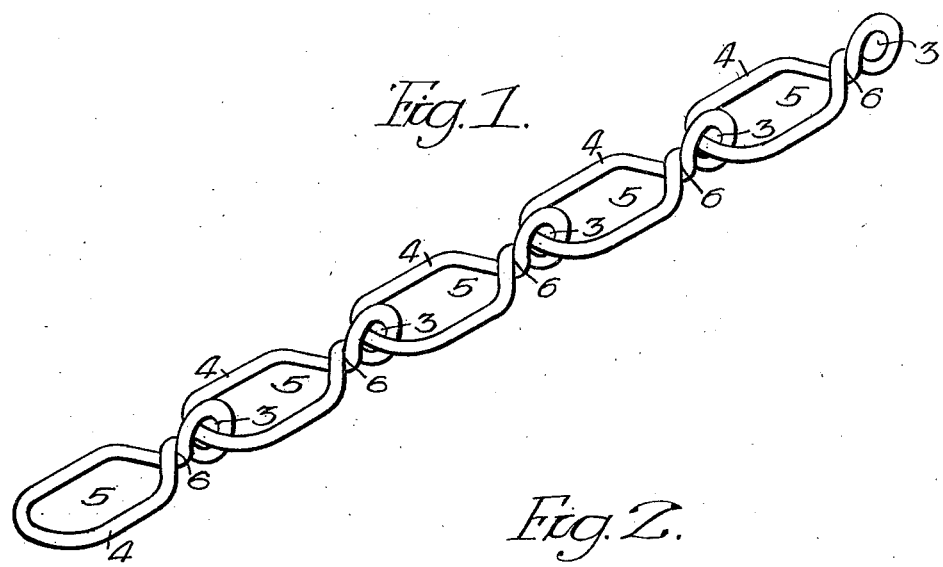
Fig. 1 is a perspective view of my improved chain.
Figure 2:
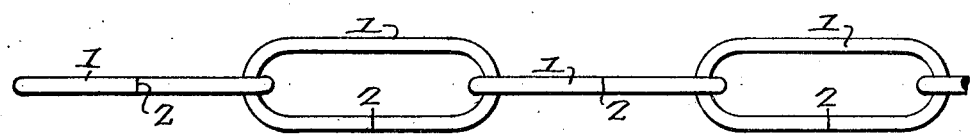
Fig. 2 is a view of an ordinary linked chain, illustrating the final step in the process of manufacturing my improved chain.
Figure 3:
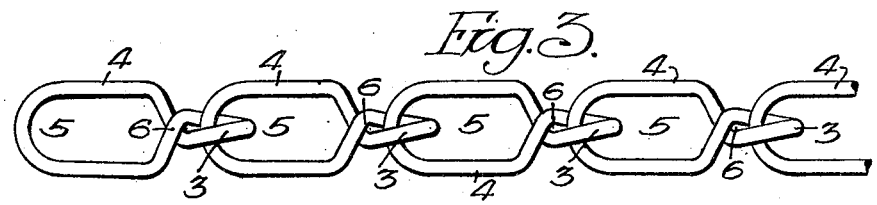
Fig. 3 is a view, showing the end of each link of the chain illustrated in Fig. 2 twisted to form an eye at right angles to the body of the link.
Figure 4:
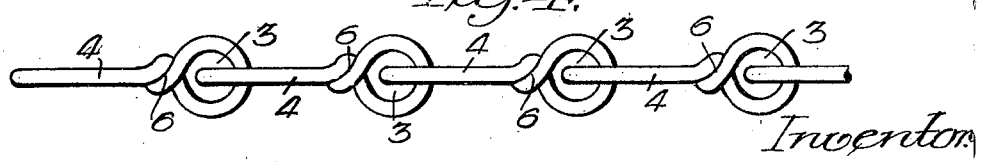
Fig. 4 is a side view of the chain shown in Fig. 3.

Referring to Fig. 2 of the drawings, 1, 1 are links, which are made of wire cut, bent and enchained with other links. The joint 2, where the two ends of the wire abut, is welded. In this chain, the body portions of the alternate links are at right angles to the body portions of the other links. The links are of sufficient length to allow the links shown in Figs. 3 and 4 to be formed.

One end of each link is twisted at 6 during the process of manufacture to form a cross-bar and a closed single strand eye 3 for the passage of an adjoining link. The eye is at right angles to the body portion of the link. This brings all of the bodies 4, 4 of the links on the same plane.

The openings 5 in the bodies of the links are closed at each end and are of a size to receive the teeth of a sprocket wheel when the chain is used as a drive chain.

A chain of this type can be used as a drive chain, an anti-skid chain for the wheels of automobiles, and in places where a substantial chain is necessary, with the body portion of the links on the same plane.

I claim:

1. A chain made of a series of links in which the body portions of the links are on the same plane, each link being a continuous wire and having a body portion and a single stand eye, the wire being twisted between the body and the eye to form a crossbar, the eye being at right angles to the plane of the body portion.

2. A link of a chain, consisting of an endless ring of wire having at one end an elongated body portion, and at the opposite end an eye to receive the body portion of an adjoining link, and having a right angle twist forming a cross-bar between the eye and the body portion.

3. The process herein described of making a chain, said process consisting in making a series of elongated enchained links of wire; welding the abutting ends of the wire forming each link; and twisting each link to form a body portion and a single strand eye, and a cross-bar between the body portion and the eye, the eye of each link being at right angles to the body portion, the wire of the body portion of one link extending through the eye of an adjoining link, the body portions of the several links being on the same plane.

MARTIN O. REHFUSS.